Patented Feb. 2, 1954

2,668,164

UNITED STATES PATENT OFFICE 2,668,164

RESINOUS COPOLYMERS OF 3,4 AND 3,5 DICHLORO-ALPHA-METHYLSTYRENE

Gilbert H. Swart, Akron, and Theodore A. Te Grotenhuis, Olmsted Falls, Ohio, assignors to The General Tire and Rubber Company, Akron, Ohio, a corporation of Ohio No Drawing. Application October 25, 1950, Serial No. 192,146

6 Claims. (Cl. 260—87.5)

This invention relates to resinous copolymers of nuclearly substituted alpha-methylstyrenes and it particularly relates to copolymers of dihalo-alpha-methylstyrenes with nuclearly substituted alpha-methylstyrenes.

This application is a continuation-in-part of our co-pending application Serial No. 145,902, filed February 23, 1950, now U. S. Patent No. 2,645,632, which was copending with a continuation of our application Serial No. 667,728, filed May 6, 1946, and now abandoned.

In order to appreciate the present invention, it is necessary to understand the polymerization activity of styrene and alpha-methylstyrene and its homologues. Styrene itself is characterized by the fact that it will form polymers with many other monomers, and will homopolymerize with itself. This tendency toward homopolymerization is not so strong but that it may be prepared with comparative ease and may be stored in the presence of inhibitors. Many of the nuclearly substituted styrenes, such as dichlorostyrene, however, have such a strong tendency toward homopolymerization that they are difficult and expensive to prepare and must be used promptly or maintained at low temperatures to prevent this homopolymerization even though inhibitors are present. They too form copolymers with other monomers.

The alpha-methylstyrenes as a class, contrary to all expectations, were considered to be relatively inert. None homopolymerized and until applicants' invention, as set forth in our aforementioned copending application Serial No. 145,902, it was not known that any dichloroalpha-methylstyrenes would copolymerize with other mono-olefins. The reason for the inactivity of the alpha-methylstyrenes was believed to be due to stearic hinderance of the methyl group. Accordingly, it was assumed that since the alpha-methylstyrenes would not homopolymerize because of this stearic hinderance that they obviously could not copolymerize with other alpha-methylstyrenes for the same reason.

The present invention is based upon the discovery that the 3,4- and 3,5-dihalo-alpha-methylstyrenes act very differently from most of the di- and trisubstituted alpha-methylstyrene isomers in that they form exceptionally useful resinous copolymers with other mono- and disubstituted alpha-methylstyrenes, such as meta-chloro-alpha-methylstyrene and para-methyl-alpha-methylstyrene and even with themselves. The comonomers must be surprisingly nuclearly substituted however as no copolymer is formed with alpha-methylstyrene itself.

The dihalo-alpha-methylstyrenes included within the scope of this invention as at least one of the comonomers are the 3,4-dichloro-alpha-methylstyrene and the 3,5-dichloro-alpha-methylstyrene both of which are free of substituents on nuclear carbons next adjacent that carrying the isopropenyl group. The mono- and disubstituted alpha-methylstyrenes with which the dihalo-alpha-methylstyrenes copolymerize have the following general formula

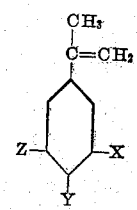

where X, Y, and Z are selected from halogen, trifluoro-methyl methyl and hydrogen and where one of the three (X, Y and Z) is always hydrogen. Halogen and especially chlorine are the preferred substituents because as far as we have been able to determine they are the only ortho-para directing groups that do not appreciably activate the benzene ring. The other ortho-para directing groups, namely, —OH, —OR, —NR$_2$ where R is hydrogen or alkyl, etc. highly activate the benzene ring and accordingly are undesirable.

Desirable 3,4-disubstituted alpha-methylstyrenes include:

3,4-dimethyl-alpha-methylstyrene
3-chloro-4-methyl-alpha-methylstyrene
3-trifluoro-methyl-4-fluoro-alpha-methylstyrene
3-methyl-4-chloro-alpha-methylstyrene
3,4-trifluoro-methyl-alpha-methylstyrene
3-fluoro-4-methyl-alpha-methylstyrene
3-bromo-4-methyl-alpha-methylstyrene
3,4-dichloro-alpha-methylstyrene Likewise, desirable 3,5-disubstituted alpha-methylstyrenes include:

3,5-trifluoro-methyl-alpha-methylstyrene
3-chloro-5-methyl-alpha-methylstyrene
3,5-dimethyl-alpha-methylstyrene
3,5-dichloro-alpha-methylstyrene Finally, desirable monosubstituted alpha-methylstyrenes include:

M-chloro-alpha-methylstyrene
P-chloro-alpha-methylstyrene
M-methyl-alpha-methylstyrene
P-methyl-alpha-methylstyrene It will be noted that all of the compounds of the general formula previously given and in the 3,4- and 3,5-dihalo-alpha-methylstyrenes are characterized by the fact that there are no substituents in the nuclear positions ortho to the iso-alkylene or isopropenyl group. In other words, in the copolymerization of compounds with which the present invention is concerned, the atoms adjacent to the one carrying the isopropenyl group are free of all substituents, i. e. are connected to hydrogen. The reason for this is the fact that we have been unable to copolymerize by any of the polymerization systems employing a free radical mechanism any nuclearly mono or disubstituted alpha-methylstyrene having a substituent in the 2 and/or 6 positions on the nucleus. Neither emulsion nor the mass procedure polymerization systems were effective although the same procedures, identical except for the different isomer of alpha-methylstyrene, were very effective for the 3,4- and 3,5-disubstituted isomers.

The 3,4-dichloro-alpha-methylstyrenes may be prepared by any suitable process, as for example by alkylation of an ortho-dihalobenzene, such as ortho-dichlorobenzene, with a propylating agent such as propylene, isopropyl alcohol, and isopropyl chloride in the presence of aluminum chloride and subsequent dehydrogenation of the dichlorocumene. This is described in detail in the Guido H. Stempel, Jr. application, Serial No. 778,747, filed October 9, 1947, now abandoned, and assigned to the assignee of the present invention.

The 3,5-dichloro-alpha-methylstyrene may be prepared as described in the aforementioned copending application of Guido H. Stempel from 3,5-dichlorobenzoic acid by treating it with thionylchloride to give 3,5-dichlorobenzoylchloride; reacting this product with methyl alcohol to form methyl 3,5-dichlorobenzoate; treating this ester with two equivalents of methyl magnesium chloride, hydrolyzing and then dehydrating the resultant complex by refluxing it with sodium bisulfate. 3,5-dichloroisopropenylbenzene had a specific gravity of 1.196 and refractive index of 1.5660 both measured at 25° C.

A preparation of 3-methyl-4-chloro-alpha-methylstyrene or 3-methyl-4-chloroisopropenylbenzene is also described in the aforementioned application of Guido H. Stempel. Briefly the process comprises subjecting 3-methyl-4-chloro-acetophenone to 4-molar methyl magnesium chloride in ether, poring the reacted mixture over cracked ice containing concentrated hydrochloric acid to form the corresponding carbinol, and dehydrating the carbinol by heating it in the presence of sodium bisulfate. The 3-methyl-4-chloro-isopropenylbenzene had a boiling point of 107 to 108° C. at 17 mm.; a refractive index (D line) of 1.5519 at 25° C.; and a $$d_{25}^{25}$$

of 1.055 g. ml.

3-chloro-4-methyl-alpha-methylstyrene or 3-chloro-4-methylisopropenylbenzene may be conveniently prepared as described in detail in Dr. Stempel's aforementioned application by oxidizing 2-chlorocymene dissolved in acetic acid with nitric acid to form 3-chloro-4-methylbenzoic acid; then after purification of this product first converting it into its ester by refluxing with methyl alcohol and concentrated sulfuric acid; then reacting this ester with 4-molar methyl magnesium bromide in either; thereafter hydrolyzing the product with an ice-hydrochloric acid mixture to form the carbinol; and refluxing the carbinol with anhydrous potassium bisulfate. The 3-chloro-4-methylisopropenylbenzene recovered by distillation boils at 80° C. at 3 mm. It has a refractive index D line at 25° C. of 1.5508.

3,4-dimethyl-alpha-methylstyrene may be prepared as more particularly described in the copending application of Guido H. Stempel, Serial No. 145,590, filed February 21, 1950, and assigned to the assignee hereof. In accordance with the process 3,4-dimethylacetophenone which is first prepared from ortho-oxylene and acetic anhydride is heated with methyl magnesium bromide, the product hydrolyzed to the carbinol and the carbinol dehydrated. The 3,4-dimethyl-alpha-methylstyrene boils at 86° C. freezes at −21° C. and has a refractive index $N_D^{25}$ of 1.5376. 3,5-dimethyl-alpha-methylstyrene is said prepared in a similar way starting with meta-xylene.

In accordance with the present invention, resinous compositions are made by copolymerizing or interpolymerizing any 3,4- and/or 3,5-dihalo-alpha-methylstyrene with each other and/or with any alpha-methylstyrene substituted according to the general formula previously given, preferably one having a halogen atom in the nucleus. Two disubstituted alpha-methylstyrenes must be present and preferably one of these contains chlorine in the nucleus.

The preferred resinous compositions are prepared by subjecting to free radical polymerizing conditions en mass, in aqueous suspension, or in emulsion a mixture of a dihalo-alpha-methylstyrene having, as previously set forth, the 2 and 6 positions free of substituents and a mono- or disubstituted alpha-methylstyrene also having the 2 and 6 positions free of substituents. The polymerization may be carried out in aqueous emulsion or suspension or en mass with or without the addition of a solvent or diluent and preferably with the aid of a suitable polymerization catalyst, i. e., those capable of forming free radicals including organic peroxides. If polymerization en mass is used it is preferred to utilize a relatively lower temperature during the first part of the polymerization and a higher temperature at the end of the cycle. An inert atmosphere should be present over the surface of the polymerizable materials to exclude oxygen which acts as an inhibitor.

Polymerization en mass on the so-called pearl or suspension polymerization, wherein the mixture of polymerizable materials with oxidizing catalyst or other free radical initiator is simply agitated in water or solution of a non-surface active protective colloid in a suitable pressure vessel at an ordinary-to-moderately elevated temperature, is preferred when a clear resin suitable as a molding powder is desired. If a clear resin is not necessary, we prefer to utilize emulsion polymerization wherein the mixture of polymerizable materials is incorporated in an aqueous solution or suspension of a surface active emulsifying agent with or without a protective colloid, and with or without the addition of pigments, plasticizers and the like, for the reason that polymerization may be more rapidly and more conveniently carried out and physical properties of the resultant copolymer are superior.

The emulsifying agents may be of the cationic (usually organic substituted quarternary ammonium compounds) or anionic types. Examples of suitable emulsifying agents which may be used are set forth in the lists of surface-active agents compiled by F. J. Van Antwerpen, published in Industrial and Engineering Chemistry, January 1939, pages 66 to 69, January 1941, pages 12 to 22, and January 1945, pages 126 to 130. Emulsifying agents and protective colloids include alkali metal and rosin fatty acid soaps, protective colloids such as bentonite methyl cellulose, carboxy methyl cellulose, polymethacrylamid, alcohol metal sulfate such as lauryl alcohol sodium sulfate, and a great many others as is well known. The usual emulsion and dispersion technology suitable for other free radical polymerizations may be used. The polymerization in aqueous emulsion is greatly facilitated by conducting it in a vessel completely filled with liquid so that there is a substantial absence of any vapor-liquid interface for reflux action to occur.

The speed of polymerization may be controlled by addition of suitable activators such as complex salts of cobalt, particularly alkali metal cobaltinitrites and alkali metal aquo hydroxylonitrite cobaltiate in conjunction with mercaptans such as dodecyl mercaptan, as well as other activators for emulsion polymerization as described in the copending application of John C. Warner and Harry Seltz, Serial No. 687,954, filed August 2, 1946, assigned to the assignee hereof and now abandoned.

The finely divided resinous compositions of the present invention may be molded directly or they may be ground or mixed with a plasticizer and/or solvent (capable of combining therewith at elevated temperature) to form a slurry which may be used as a coating or molding composition, etc. and the thus coated material subjected to heat to cause coalescense of the solid particles and compatibility with plasticizer and remaining solvent. The resin may for example be ball mill ground in the presence of a plasticizer which is compatible at non-destructive elevated temperatures, preferably diluted with a solvent or thinner such as a drying oil, aromatic hydrocarbon liquids, etc. and used as a coating or dipping composition. If a dispersing agent such as one or more water insoluble soaps, long chain amines, ink lengthener such as Sun Oil Company's "EE-Lengthenor," is present (preferably during part of the grinding operation) a more flowable slurry or dispersion of finely divided resin is produced in said plasticizer. Hot metal articles (heated about 250° C.) dipped into such a dispersion retain relatively heavy layers thereon. After drying and heating the thus coated article to a temperature of about 300° C. or sufficiently to coalesce the dispersed particles, a coherent protective film of surprising strength may be had over the surface of the metal.

The molded resinous copolymers of the present invention are generally characterized by having a substantially higher heat distortion than have polymers of styrene and copolymers of other mono-olefinic materials. The nuclear halogenated alpha-methylstyrene copolymers with chlorine in the 3, 4, or 5 positions have another surprising and outstanding feature in that they are found to be resistant to the deteriorating effect of hydrocarbons such as gasoline.

Polystyrene and hydrocarbon copolymers of polystyrene with alpha-methylstyrene and many other styrene derivatives have the undesirable characteristics of rapidly deteriorating when contacted with hydrocarbon liquids, such as gasoline, lubricating oils or solvents. Even as little as may be contained in wax and other dressings with which they might come in contact often cause destruction. They are also susceptible to absorption of plasticizers such as may be present in vinyl resins and the like. This deterioration is so extensive that a polystyrene article, for example, when contacted for only a few minutes with hydrocarbons will develop cracks and crevices that may extend through the entire article and cause it to disintegrate or to have an unsightly appearance. This fact and the fact that it and most other thermoplastic synthetic resins have a very low ASTM heat distortion temperature so that articles of these materials cannot be boiled in water without destroying a molded article perhaps constitute the most serious drawbacks to general acceptance of these resins.

The following example of this invention is given to illustrate our invention:

Example I

| | |
|---|---|
| 3,5-dichloro-alpha-methylstyrene | 50 |
| 3,4-dichloro-alpha-methylstyrene emulsifying agent | 50 |
| (Dresinate No. 731 which is believed to be a sodium soap of hydrogenated rosin) | 4.0 |
| NaOH | 0.1 |
| Catalyst (cumene hydroperoxide) | 0.3 |
| Water | 200 |

The 3,5-dichloro-alpha-methylstyrene and the 3,4-dichloro-alpha-methylstyrene were mixed together with the addition of a catalyst and the whole emulsified into the alkaline solution of the emulsifying agent and incorporated into a closed polymerization vessel which was so proportioned that the emulsion completely filled the vessel and there was a complete absence of vapor space above the emulsion. The vessel was fitted with a trap and stand pipe filled with aqueous liquid to maintain a slight pressure on the polymerizable ingredients and act as a reservoir to insure the absence of vapor space after contraction of volume occurred as a result of polymerization. The temperature was kept at 50° C. with constant agitation until the mixture was completely polymerized.

The resultant latex was coagulated with 10 per cent acetic acid, washed with water, and the coagulum dried in an oven at 60° C. The dried coagulum was first pelletized and then molded into test bars utilizing injection molding technique at pressures of 10,000 to 30,000 p. s. i. and mold temperature around 500° F. The ASTM heat distortion point of the molded article was above 160° C.

The above copolymer is soluble in aromatic solvent mixtures and has because of the extremely high softening point, exceptionally desirable properties for the preparation of printing inks suitable for modern high speed presses. The polymerization of these materials is indeed surprising as neither noticeably homopolymerizes and it was assumed that the alpha-methyl group prevented two such molecules from getting together.

The following examples are given to further illustrate the selective copolymerization of the 3,4-dichloro-alpha-methylstyrene. The 50 parts of 3,4-dichloro-alpha-methylstyrene were successively mixed with 50 parts of each of the monomers shown in the following table and emulsified in 180 parts of water containing 5 per cent of soap (Na stearate) and 3 parts of sodium persulfate, the emulsion was treated as in Example I and the polymerization was carried out at 50° C. The materials were maintained in this temperature for two weeks. The yield, melting point, percentage of bound chlorine in the copolymer and the ratio of monomers in the final polymer as indicated by the percentage of chlorine is shown in the following table:

| Monomer | Percent Yield | M. P., °C. | Percent Chlorine | (1) |
|---|---|---|---|---|
| Alpha-methylstyrene | 0 | | | |
| M-chloro-alpha-methylstyrene | 54 | 195 | 26.87 | 1:4 |
| P-chloro-alpha-methylstyrene | 56 | 195 | 26.37 | 1:4 |
| P-methyl-alpha-methylstyrene | 46 | 185 | 17.13 | 1:1.7 |
| 4-Fluoro-3-trifluoromethyl-alpha-methylstyrene | 42 | 190 | 17.42 | 1:1.1 |

1 Shows the percentage of monomers as calculated from bound chlorine in the copolymer.

The above shows the fact that there is something more than steric considerations that render the homopolymerization of the alpha-methylstyrene derivatives unfeasible. It also illustrates the fact that there must be more than steric considerations that determine the copolymerizability of the various monomeric materials.

Although several embodiments of the invention have been herein shown and described, it will be understood that in accordance with the provisions of the patent statutes modifications may be made without departing from the spirit thereof and it is intended that the invention be limited only by the appended claims.

What we claim is:

1. A solid interpolymerization product of at least two different substituted alpha methyl styrene liquids consisting essentially of (1) at least one alpha-methystyrene which has at least one nuclear substituent selected from the group consisting of halogen, trifluoromethyl, methyl and hydrogen on the 3,4 or 5 positions and (2) at least one member of the group consisting of the 3,4 and 3,5 dihalo-alpha-methylstyrenes, all of the alpha-methylstyrenes being characterized by absence of substituents on the 2 and 6 positions on the nucleus.

2. A solid interpolymerization product of at least two different substituted alpha methyl styrene monomers consisting essentially of (1) at least one member of the group consisting of the mono- and disubstituted alpha-methylstyrene having all of their substituents selected from the group consisting of halogen, trifluoromethyl, methyl and hydrogen and being further characterized by the fact that none of the above substituents are on the 2 or 6 positions on the nucleus and (2) at least one member of the group consisting of 3,4- and 3,5-dihalo-alpha-methylstyrenes having no substituents on the 2 and 6 positions on the nucleus.

3. A resinous interpolymerization product of a liquid comprising 3,4-dichloro-alpha-methylstyrene and 3,5-dichloro-alpha-methylstyrene.

4. A resinous copolymerization product of 3,4-dichloro-alpha-methylstyrene and meta-chloro-alpha-methylstyrene.

5. A resinous copolymerization product of 3,4-dichloro-alpha-methylstyrene and para-chloro-alpha-methylstyrene.

6. A resinous copolymerization product of 3,4-dichloro-alpha-methylstyrene and 4-fluoro-3-trifluoro-methyl-alpha-methylstyrene.

GILBERT H. SWART.
THEODORE A. TE GROTENHUIS.

References Cited in the file of this patent
UNITED STATES PATENTS

| Number | Name | Date |
|---|---|---|
| 2,522,981 | Bachman et al. | Sept. 19, 1950 |